United States Patent [19]

Chi

[11] 4,416,955
[45] Nov. 22, 1983

[54] FUEL CELL SUB-ASSEMBLY

[75] Inventor: Chang V. Chi, Brookfield, Conn.

[73] Assignee: Energy Research Corporation, Danbury, Conn.

[21] Appl. No.: 338,354

[22] Filed: Jan. 11, 1982

[51] Int. Cl.³ .......................................... H01M 8/02
[52] U.S. Cl. ........................................ 429/26; 429/36
[58] Field of Search ...................... 429/26, 36, 38, 39

[56] References Cited

U.S. PATENT DOCUMENTS 4,233,369 11/1980 Breault et al. .................... 429/26
4,324,844 4/1982 Kothmann ........................ 429/26

Primary Examiner—Donald L. Walton

[57] ABSTRACT

A fuel cell sub-assembly comprising a plurality of fuel cells, a first section of a cooling means disposed at an end of the assembly and means for connecting the fuel cells and first section together to form a unitary structure.

19 Claims, 1 Drawing Figure

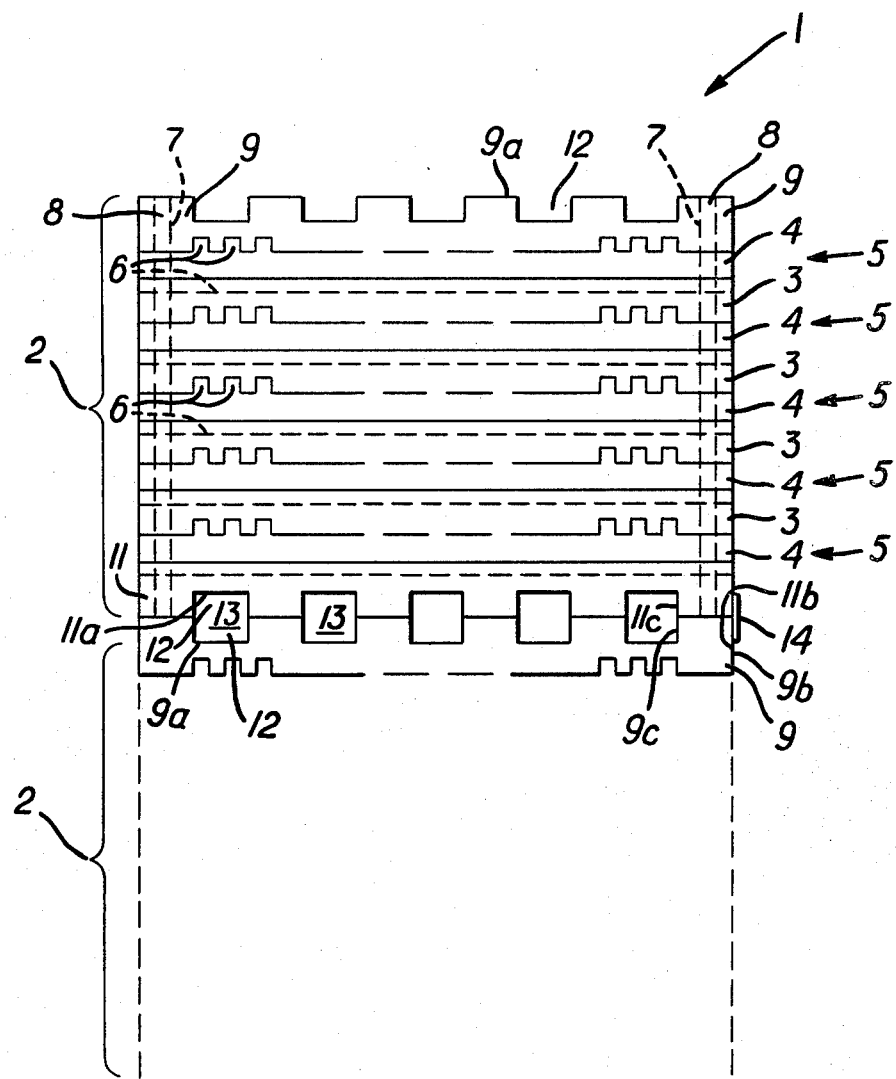

FUEL CELL SUB-ASSEMBLY

BACKGROUND OF THE INVENTION

This invention relates to fuel cells and, in particular, to fuel cells to be arranged in stack form.

In the present day construction of fuel cell stacks, individual fuel cells are disposed one on the other and external connectors are used to hold the cells together. With this type of construction, the stack must be entirely disassembled, in order to replace a defective cell. As the number of cells grow larger, location of a specific defective cell and disassembly of the stack to replace same become extremely difficult, if not impossible. As a result, what is sometimes done is to bypass a group of cells inclusive of the defective cell and to use the stack in this form.

The above procedure, however, reduces the stack performance and requires cumbersome bypass equipment. It is, therefore, far from an entirely satisfactory solution to the problem.

Corresponding application Ser. No. 338,353, filed Jan. 11, 1982, now U.S. Pat. No. 4,397,917, assigned to the same assignee hereof describes a fuel cell stack comprised of a plurality of fuel cell packs each containing a plurality of fuel cells which are internally connected to form a unit and, therefore, are removable from the stack together and independently of the fuel cells of the other packs. Such fuel cell packs make the detection of defective cells and removal of same from the stack a simple procedure, since an entire pack may be removed from the stack and replaced without disturbing the other packs of the stack.

While fuel cell packs of the aforesaid type are thus quite advantageous, further techniques are still being explored to further enhance their usefulness.

It is an object of the present invention to provide a fuel cell sub-assembly which is adapted to facilitate removal of such sub-assembly from other sub-assemblies in a fuel cell stack.

It is also an object of the present invention to provide a fuel cell sub-assembly while is adapted to permit its removal from other sub-assemblies in a fuel cell stack without causing substantial damage to itself or the other sub-assemblies.

SUMMARY OF THE INVENTION

The above and other objects are realized in accordance with the principles of the present invention in an apparatus comprising a fuel cell sub-assembly, the sub-assembly including a plurality of fuel cells and having at one end a first section of a cooling means, the latter first section and the fuel cells being held together to form a unitary structure by a connecting means. A further fuel cell sub-assembly also including a plurality of fuel cells is provided at one of its ends with a second section of the cooling means, this second section and the fuel cells of the further sub-assembly also being held together by a connecting means for form a unitary structure. The two sub-assemblies are arranged with the first and second sections adjacent one another to thereby form the cooling means and a fuel cell stack. A breakable seal is also provided to seal the formed cooling means against leakage.

With the apparatus of the invention, the connection of sub-assemblies is thus advantageously made at a cooling means which is usually of greater strength than other cell components and, therefore, is less likely to be damaged during assembly and disassembly. Furthermore, the use of a breakable seal allows for ready removal of a sub-assembly for maintenance or replacement.

BRIEF DESCRIPTION OF THE DRAWINGS

The above and other features and aspects of the present invention will become more apparent upon reading the following detailed description in conjunction with the attached sole drawing which illustrates apparatus in accordance with the principles of the present invention.

DETAILED DESCRIPTION

In the FIGURE, a fuel cell stack 1 is formed by stacking a plurality of fuel cell sub-assemblies 2 constructed in accordance with the principles of the present invention. The sub-assemblies 2 are of similar make-up and only one sub-assembly and the topend of a second are actually shown.

Each sub-assembly 2 includes a plurality of bipolar plates 3 and a plurality of composites comprised of anode and cathode electrodes sandwiching a matrix. The composites 4 are sandwiched between the plates 3 to define a plurality of fuel cells 5. The plates 3 are further provided with process gas passages 6 for carrying process gas to their respective cells.

In accordance with the invention, the plates 3 and composites 4 are held together to form a unit. Connection of the plates and composites is preferably realized by use of a means internal of the sub-assembly as is disclosed in the aforementioned copending application. In particular, passages 7 extend through the sub-assembly and are filled with a high-strength adhesive 8 to provide the desired connection. In place of the adhesive 8, a cylindrical friction fitting plug might also have been employed. Furthermore, an alternative means of connecting the sub-assembly components would be to provide adhesive between adjacent flat facing surfaces of the components. This form of connection might also be used in conjunction with the form shown.

While internal interconnection is preferable for the sub-assembly 2, it should be noted that the principles of the invention are intended to extend to other modes of connection as well. Thus, for example, external modes of connection are intended to be within the scope of the invention.

In further accordance with the invention, each assembly 2 is additionally provided at one or both of its ends with sections of a cooling means. In the present case, each assembly includes a first half cooling plate 9 at its upper end and a second half cooling plate 11 at its lower end. These cooling plates are also connected via the passages 7 and adhesive 8 to the cells 5 so that the unit formed is inclusive of the plates.

As shown, the cooling plates include in their outer surfaces (i.e., their surfaces 9a and 11a facing outward of the assembly 2) open half-channels 12 for carrying a cooling gas. Alternatively, the outer surface of a plate might also be flat as long as the outer surface of the plate of the adjacent sub-assembly has the necessary open channels for carrying the cooling gas. Furthermore, in the present case each plate forms a fuel cell 5 with its adjacent composite 4 and bipolar plate 3 and is provided with process gas passages 6 for this purpose.

As can be appreciated, disposing of the sub-assemblies 2 one on the other to form the stack 1 results in placing the cooling plate 11 of each sub-assembly adjacent to a corresponding cooling plate 9 of the next sub-assembly. The adjacent cooling plates thus form a total cooling means having closed full cooling channels 13 formed from the mating open half-channels 12 of each plate.

In further accord with the invention and to prevent leakage from the cooling channels 13, a seal 14 is provided at the interface between adjacent cooling plates 11 and 9. As shown, the seal 14 is disposed along the vertical end wall of each plate bridging the joint therebetween. Other locations for the seal can also be used alone or in conjunction with the depicted seal. Thus, the seal may be located on the peripheral facing surfaces areas of 11b and 9b of the cooling plates as well as on the vertical sidewalls 11c and 9c of the end channels.

The seal 14 is further adapted to be readily breakable so as to permit disassembly or removal of each subassembly 2 from the stack 1. Typical breakable sealing mechanisms might be realized by gaskets, pastes or adhesive tapes or a combination of these. Furthermore, the areas of the plates receiving the sealing material might be grooved so as to promote the sealing effect.

With the sub-assemblies 2 constructed as aforesaid, significant advantages are found to result. Thus, the cooling plates 9 and 11, which are usually thicker than the other cell components, provide mechanical strength to the sub-assemblies 2 and greatly reduce the likelihood of breakage during assembly of the stack 1 and during subsequent removal of a sub-assembly 2 for repair or replacement. Futhermore, the larger surface area provided by the end cooling plates enables better sealing during pretesting of each sub-assembly, thereby increasing the assurance that only operative cells will be included in the stack 1. Additionally, the use of a breakable seal 14 between cooling plates simplifies the stack assembly procedure as curing of the sealing material is avoided, thereby saving labor and the expense of curing ovens. Additionally, the sub-assemblies 2 can be readily separated from the stack 1 for repair or replacement.

In all cases, it is understood that the above-described arrangements are merely illustrative of the many possible specific embodiments which represent applications of the present invention. Numerous and varied other arrangements can readily be devised without departing from the spirit and scope of the invention. Thus, for example, the sealing of the interface between the plates can be further facilitated by providing the plates with male and female joints in their flat facing surfaces.

What I claim is:

1. Apparatus comprising:
a first fuel cell assembly including:
a first plurality of fuel cells arranged one adjacent the other;
a first section of a cooling means arranged at an end of said first assembly;
and first means for holding said first fuel cells and said first section together to form a unitary structure.

2. Apparatus in accordance with claim 1 further comprising:
a second fuel cell assembly including:
a second plurality of fuel cells arranged one adjacent the other;
a second section of said cooling means arranged at an end of said second assembly;
and second means for holding said second fuel cells and said second section together to form a unitary structure.

3. Apparatus in accordance with claim 2 wherein:
said first and second sub-assemblies are arranged one adjacent the other and such that said first section is adjacent to said second section, whereby said sub-assemblies form a fuel cell stack and said first and second sections form said cooling means.

4. Apparatus in accordance with claim 3 further comprising:
breakable sealing means for preventing leakage from said cooling means.

5. Apparatus in accordance with claim 4 wherein:
said sealing means is disposed at interface areas of said first and second sections.

6. Apparatus in accordance with claim 5 wherein:
said interface areas are located on adjacent end walls of said first and second sections.

7. Apparatus in accordance with claim 6 wherein:
said interface areas are further located on adjacent facing surfaces of said first and second sections.

8. Apparatus in accordance with claim 5 wherein:
said interface areas are located on adjacent facing surfaces of said first and second sections.

9. Apparatus in accordance with claim 3 or 4 wherein:
said first and second sections comprise first and second plates, respectively, said plates when in adjacent relationship together defining one or more closed channels for conveying a cooling gas.

10. Apparatus in accordance with claim 9 wherein:
said first plate has one or more open channels in the surface facing said second plate;
the surface of said second plate facing said first plate is flat;
and the one or more open channels in said surface of said first plate and the facing flat surface areas of said flat surface of said second plate define said one or more closed channels.

11. Apparatus in accordance with claim 9 wherein:
said first plate has one or more open channels in the surface facing said second plate;
said second plate has one or more open channels in the surface facing said first plate;
and said one or more open channels in the surface of said first plate and the one or more open channels in the surface of said second plate define said one or more closed channels.

12. Apparatus in accordance with claim 9 wherein:
said first means is internal of said first sub-assembly;
and said second means is internal of said second sub-assembly.

13. Apparatus in accordance with claim 4 wherein:
said breakable sealing means is one of a gasket, paste, low-strength adhesive and tape.

14. Apparatus in accordance with claim 1 wherein:
said first section comprises a plate.

15. Apparatus in accordance with claim 14 wherein:
said plate has a flat outer surface.

16. Apparatus in accordance with claim 14 wherein:
the outer surface of said plate has one or more open channels.

17. Apparatus in accordance with claim 14 wherein:
said plate forms a part of the one of the said first plurality of fuel cells at said end of said first assembly.

18. Apparatus in accordance with claim 1 further comprising:
a section of a cooling means arranged at the other end of said first assembly.

19. Apparatus in accordance with claim 1 wherein:
said
first means is internal of said first sub-assembly.

* * * * *